(No Model.)
S. LEWINSOHN.
PROCESS OF MAKING IMITATION LONG HERON FEATHERS.
No. 485,329. Patented Nov. 1, 1892.
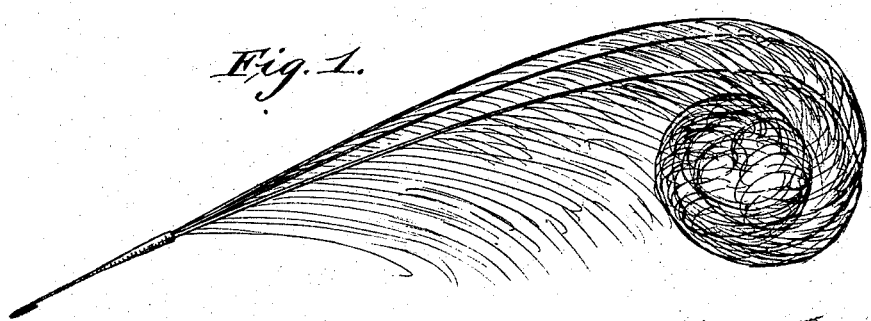
Fig. 1.
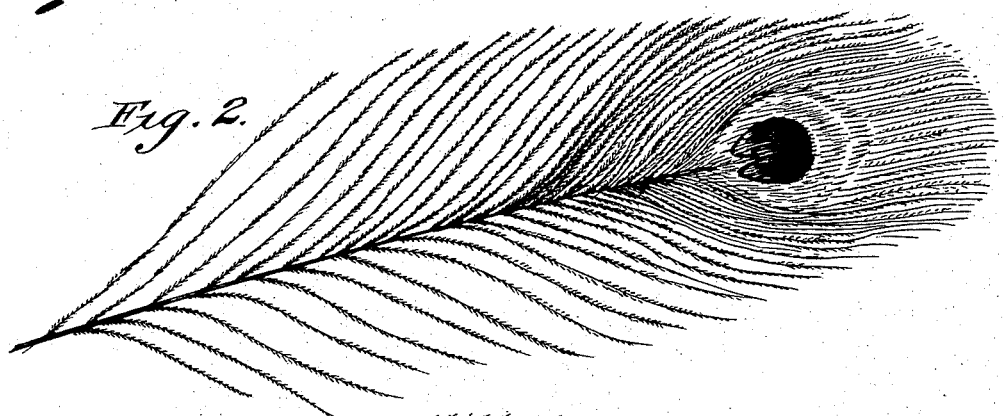
Fig. 2.
Fig. 3.
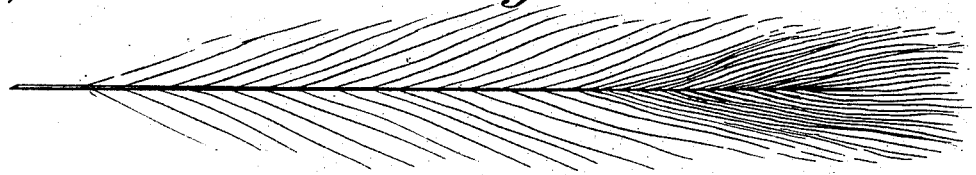
Fig. 4.
Fig. 5.
Witnesses
Severance
W. H. Muzzy
Inventor
Simon Lewinsohn
by W. H. Babcock
Attorney

UNITED STATES PATENT OFFICE.

SIMON LEWINSOHN, OF BERLIN, GERMANY.

PROCESS OF MAKING IMITATION LONG HERON-FEATHERS.

SPECIFICATION forming part of Letters Patent No. 485,329, dated November 1, 1892.

Application filed June 28, 1892. Serial No. 438,276. (No specimens.)

*To all whom it may concern:*

Be it known that I, SIMON LEWINSOHN, a subject of the Emperor of Germany, residing in the city of Berlin, in the Kingdom of Prussia and Empire of Germany, have invented a certain new and useful Process for Making Imitation Long Heron-Feathers from Peacock Feathers; and I do hereby declare the following to be a full, clear, and exact description of the invention, such as will enable others skilled in the art to which it appertains to make and use the same.

The object of this invention is to provide a cheap imitative substitute for the ornamental but expensive long heron-feathers in millinery and kindred arts. To this end I make use of peacock's feathers as raw material and subject them to the transforming process hereinafter particularly set forth and claimed, and the article produced thereby.

In the accompanying drawings, Figure 1 represents a specimen of genuine long heron-feathers. Figs. 2 and 3 represent, respectively, samples of peacock's eyes and sword, both tail-feathers, which are to be operated on. Fig. 4 represents the same after the fluff has been removed and they have been dyed and bleached, and Fig. 5 represents the complete article.

The process is as follows: I first take peacock's tail-feathers, as illustrated in Figs. 2 and 3, and leach them in any suitable leaching material to remove the fluff, which the individual plumes or sprays exhibit, so that these plumes or sprays will receive the thin appearance of the genuine long heron plumes or sprays. Next the feathers are bleached and dyed in any suitable way, taking the appearance shown in Fig. 4. Finally, the feathers are bent or curled and the plumes or sprays are removed from one side of the stem, leaving the other side intact. The finished article thus produced, Fig. 5, may be arranged and combined with others of its kind to form very beautiful fancy work. Genuine long heron-feathers are only to be had at high prices; but the substitute thus produced is cheap and closely resembles the genuine article, answering most purposes nearly or quite as well. The same process may be applied to producing an imitation of other valuable feathers.

Having thus described my invention, what I claim as new, and desire to secure by Letters Patent, is—

1. The process of producing imitation long heron-feathers, consisting in the following steps: first leaching peacock tail-feathers to remove the fluff from the individual plumes or sprays, then bleaching and dyeing the said feathers, and finally bending or curling them and stripping the sprays from one side only of each stem, as set forth.

2. An imitation long heron-feather consisting of a peacock's feather free from fluff, colorless, and having a curly form, as described and shown.

In testimony whereof I have hereunto signed my name in the presence of two subscribing witnesses.

SIMON LEWINSOHN.

Witnesses:
 HEINRICH SCHULZ,
 SIEGMUND WEIL.